United States Patent
Jule et al.

(10) Patent No.: US 6,398,161 B1
(45) Date of Patent: Jun. 4, 2002

(54) DEVICE FOR FIXING AN AIRCRAFT PROPULSION SYSTEM TO A STRUT AND A STRUT ADAPTED TO SAID DEVICE

(75) Inventors: Pascal Jule, Tournefeville; Alain Porte, Colomiers; Stéphane Levert, Toulouse, all of (FR)

(73) Assignee: Aerospatiale Airbus, Paris (FR)

( * ) Notice: Subject to any disclaimer, the term of this patent is extended or adjusted under 35 U.S.C. 154(b) by 0 days.

(21) Appl. No.: 09/553,380

(22) Filed: Apr. 20, 2000

(30) Foreign Application Priority Data

May 17, 1999 (FR) .............................. 99 06216

(51) Int. Cl.$^7$ .............................................. B64D 27/26
(52) U.S. Cl. ........................................ 244/54; 248/554
(58) Field of Search ..................... 246/53 R, 54; 60/39.31, 266.1; 248/554

(56) References Cited

U.S. PATENT DOCUMENTS

| | | | | |
|---|---|---|---|---|
| 4,458,863 A | | 7/1984 | Smith | |
| 5,181,675 A | * | 1/1993 | Lardellier et al. | 244/54 |
| 5,409,184 A | * | 4/1995 | Udall et al. | 244/54 |
| 5,452,575 A | * | 9/1995 | Freid | 244/54 |
| 5,524,847 A | * | 6/1996 | Brodell et al. | 244/54 |
| 5,806,792 A | * | 9/1998 | Brossier et al. | 244/54 |

FOREIGN PATENT DOCUMENTS

| | | |
|---|---|---|
| EP | 0741074 | 11/1996 |
| EP | 0805108 | 11/1997 |

* cited by examiner

*Primary Examiner*—Galen L. Barefoot
(74) *Attorney, Agent, or Firm*—Burns Doane Swecker & Mathis LLP

(57) ABSTRACT

An aircraft propulsion system (10) is connected to a strut, fixed to the wing or fuselage, by a fixing device comprising at least one rear mount (22) and two front mounts (24, 26). The rear mount (22) and a first (24) of the front mounts connect a main part (12*a*) of the frame (12) of the strut to the central casing (16) of the engine. The other front mount (26) connects a front part (12*b*) projecting from the strut frame (12) to the fan stator case (20) and mainly takes up the vertical forces (Z). Thus, the first front mount (24) can be simplified and bending or sagging of the engine is reduced.

9 Claims, 6 Drawing Sheets

DEVICE FOR FIXING AN AIRCRAFT PROPULSION SYSTEM TO A STRUT AND A STRUT ADAPTED TO SAID DEVICE

TECHNICAL FIELD

The invention relates to a fixing device by means of which an aircraft propulsion system comprising an engine and a pod is connected to a strut fixed to a structural element of the aircraft such as a fuselage or wing element.

The invention also relates to an attachment strut able to support an aircraft propulsion system through such a fixing device.

The fixing device and the strut according to the invention can be used on any type of aircraft. A preferred application relates to aircraft of modern design, whose engines are equipped with very large diameter fans.

PRIOR ART

On an aircraft, the strut constitutes the connecting interface between the propulsion system, including the engine and the pod, and the aircraft fuselage or wing. It permits the transmission to the aircraft structure of forces generated by the engine (structural function). It also ensures the passage of fuel, electricity (control and power), hydraulics and air between the propulsion system and the aircraft (system function). Apart from these two functions, the strut must respect different constraints such as the obtaining of maximum safety, with an aerodynamic drag, a weight and a cost which must be as low as possible.

To ensure the transmission of forces, the strut comprises a primary structure, having a frame, e.g. in box form. In this case, said frame comprises ribs and panels, as well as mounts through which the strut is connected on the one hand to the structure of the aircraft and on the other to the propulsion system.

The strut also comprises a secondary structure ensuring the segregation and retention of the systems, whilst supporting aerodynamic shrouds.

In order to be able to ensure the transmission of forces between the propulsion system and the aircraft structure, the mounts interposed between the strut and the propulsion system are at least partly anchored to the central casing. Therefore the strut penetrates the secondary flow duct formed between said central casing and the pod which surrounds it. To disturb to the very minimum the air flow in said secondary duct, the front part of the strut must be as narrow as possible.

As is very diagrammatically illustrated in FIGS. 1A and 1B of the attached drawings, there are at present two main types of devices for fixing a propulsion system 1 to a not shown strut fixed to a structural element of an aircraft.

A first type of known fixing device, illustrated in FIG. 1A, is generally known as a "core fixture". This fixture is characterized by the use of a front mount 3 and a rear mount 4, directly linking the strut to the central casing 5. The front mount 3 links the strut to a front part of the central casing 5, located just to the rear of the fan stator case 6. Said front part of the central casing 5 mainly constitutes the casing of the high pressure compressor of the engine. The rear mount 4 is interposed between the strut and the rear of the central casing 5.

To facilitate understanding, an orthonormal fix OXYZ is allocated to the propulsion system 1 and in it the longitudinal axis OX coincides with the longitudinal axis of the propulsion system 1 and is oriented towards the front. The lateral axis OY is perpendicular to the OX axis and to the median plane of the strut (said latter plane being vertical or perpendicular to the lower surface of the wing when the engine is suspended on said wing in the manner shown). Finally, the OZ axis is perpendicular to the OX and OY axes, i.e. vertical in the embodiment shown. The OZ axis is oriented from the engine to the strut, i.e. upwards. In the case of an engine attached laterally to the fuselage of an aircraft, the OY axis would be oriented downwards and the OZ axis in a substantially horizontal plane. However, the OY and OZ axes will be respectively called the "lateral axis" and "vertical axis" throughout the text.

In a fixture of the "core" type, as illustrated in FIG. 1A, the front mount 3 ensures the transmission of forces exerted between the central casing 5 of the engine and the strut in longitudinal X, lateral Y and vertical Z directions (in the case represented of a propulsion system beneath the wing) relative to the propulsion system 1.

For its part, the rear mount 4 ensures the transmission of forces exerted between the central casing 5 of the engine and the strut in lateral Y and vertical Z directions, as well as the transmission of the moment $M_X$ in accordance with the longitudinal axis OX.

In the second type of conventional fixture illustrated in FIG. 1B and generally known as the "hybrid fan fixture", the link between the propulsion system 1 and the strut is also ensured by a front mount 3' and a rear mount 4 (cf. also EP-A-741 074 and EP-A-805 108).

The front mount 3' is interposed between the strut and the fan stator case 6 of the propulsion system 1. It ensures the transmission of forces in the lateral direction Y and vertical direction Z with respect to the propulsion system 1.

As in the core-type fixture, the rear mount 4 is interposed between the strut and the rear part of the central casing 5. This rear mount 4 ensures the transmission of forces exerted between the central casing 5 of the engine and the strut in the lateral direction Y and vertical direction Z with respect to the propulsion system 1, as well as the transmission of moments $M_X$ in the longitudinal axis OX. Moreover, two rods 7 linking the rear mount 4 to the front part of the central casing 5 enable the rear mount 4 to also transmit forces exerted between the central casing 5 of the engine and the strut in the longitudinal direction X.

To make aircraft engines more economic, aircraft manufacturers attempt to increase their bypass ratio. This leads to increasing the diameter of the fan, which is generally located at the front of the propulsion system. However, this engine size increase leads to numerous problems associated with existing fixture devices.

Thus, when using a core-type fixing device, as illustrated in FIG. 1A, the diameter difference between the fan stator case and the central casing of the engine increases engine bending phenomena, which are particularly sensitive with this fixture type. Particularly under certain flight conditions and in particular on take-off, the aerodynamic support on the air intake, transmitted on the front of the engine fan, gives rise to a significant engine bending between its two mounts 3 and 4. To prevent the rubbing of the rotary fan blades on the fan stator case 6 and the rubbing of the rotary compressor and turbine blades on the central casing of the engine, it is consequently necessary to provide a clearance between the end of the different blades and the corresponding casings. These clearances increase in size with the rise in the bypass ratio of the engines. Under certain flight conditions and in particular in the cruising phase, the engine resumes its normal bending state. Thus, the clearance at the end of the blades increases with the bypass ratio, so that the overall engine efficiency is reduced.

When the link between the propulsion system and the strut is ensured by a hybrid fan-type fixing device, as illustrated in FIG. 1B, the increase in the diameter of the fan increases aircraft resonance problems, which are particularly sensitive with this fixture type. Thus, this fixture is characterized by the fact that the system constituted by the strut and the engine behaves like a pendulum including a weight (the engine) hung on a wing by a spring (the strut). Under certain flight conditions, the wing excites the thus designed pendulum. To solve this problem, it is not acceptable to increase the hung weight. It is therefore necessary to increase the stiffness of the strut by increasing the thickness of certain of the components forming it. This phenomenon also exists on using core-type fixing devices, but the hybrid fan-type fixture is more prejudicial because it requires a greater weight increase for obtaining the same strut stiffness increase. This problem is accentuated on increasing the engine size. To avoid it, it would be necessary to rigidify the strut, whilst increasing its external dimensions. However, this would mean a significant increase in the strut width, weight, cost and aerodynamic drag, which is clearly undesirable.

DESCRIPTION OF THE INVENTION

The object of the invention is a device for fixing a propulsion system to a strut fixed to a structural element of an aircraft, whose original design enables it to better distribute the forces transmitted through the strut, in order to obviate the problems produced by an increase in engine size and weight.

A further object of the invention is a fixing device, whose original design enables it to reduce engine bending or sagging in the critical flight phases such as take off, so as to optimize engine performance characteristics when cruising.

Yet another object of the invention is a fixing device making it possible to ensure a good vertical and lateral stiffness of the fixture without increasing the dimensions of the strut, so as to eliminate aircraft resonating and vibrating problems without increasing the weight, cost or aerodynamic drag.

According to the invention, these results are obtained by means of a device for fixing an aircraft propulsion system to a strut fixed to a structural element of the aircraft, the propulsion system comprising an engine having a central casing and a fan stator case, the device including a first front mount and a rear mount system, respectively linking to the strut a front part and a rear part of the central casing of the engine, said device being characterized in that it also comprises a second front mount linking the fan stator case to the strut.

The use of at least three unaligned mounts for ensuring the transmission of forces exerted between the engine and the strut makes it possible to considerably reduce the pendulum effect and resonating effect of the aircraft resulting therefrom. This improvement is all the more pronounced as the fan diameter increases.

Moreover, as the forces exerted between the engine and the strut are transmitted thereto at at least three instead of two points, the bending phenomena of the engine and the engine-aircraft links are greatly reduced.

Moreover, the addition of at least one supplementary mount between the engine and the strut permits a better distribution of the forces having to be transmitted to the latter.

Thus, in a preferred embodiment of the invention, the second front mount is normally able to transfer forces mainly exerted in a direction Z oriented radially from the engine to the strut.

Here and in the remainder of the text, the term "normally" means "under normal flight conditions", as opposed to special conditions such as the breaking of a part, landing without wheels down, etc.

The expression "forces mainly exerted in one direction" means here and in the remainder of the text that the forces transferred in this way from the engine to the strut are not necessarily perfectly oriented in said direction. Thus, in the case of the Z direction, said forces can be exerted in a direction Z', which is inclined by a few degrees, e.g. in the OXZ plane, to reduce to the minimum the contribution of forces exerted in this direction to the bending of the engine.

In the preferred embodiment of the invention, the first front mount is normally able to transfer forces mainly exerted in a lateral direction Y with respect to the engine and the rear mount system is normally able to transfer forces exerted in the direction Z oriented radially from the engine to the strut and in the lateral direction Y, as well as a moment along the engine longitudinal axis OX.

In this case, the transmission of thrust forces in a direction X, longitudinal with respect to the engine, can take place normally either through the first front mount, or through the rear mount system, or through a fourth mount interposed between the central casing of the engine and the strut and allocated to said function.

The second front mount is connected to the fan stator case in a structural area thereof able to transmit forces. The first front mount and the rear mount system are connected to the central casing of the engine in structural areas of said casing able to transmit the forces. In the case of the second front mount, said structural area of the fan stator case can in particular be structurally connected to the central casing of the engine by stationary vanes.

The invention also relates to a strut for attaching a propulsion system to an aircraft structural element able to support the propulsion system by a fixing device of the type defined hereinbefore, in which the strut frame comprises a main part, whereof an interface can be connected to the engine casing by the first front mount and by the rear mount system, the strut frame also comprising a front part projecting with respect to the main part, at a location displaced towards the exterior of the propulsion system with respect to said interface, said projecting front part being connectable to the fan stator case by the second front mount.

BRIEF DESCRIPTION OF THE DRAWINGS

A description will now be given of non-limitative embodiments of the invention with reference to the attached drawings, wherein show.

DETAILED DESCRIPTION OF SEVERAL PREFERRED EMBODIMENTS OF THE INVENTION

Figure 1A:
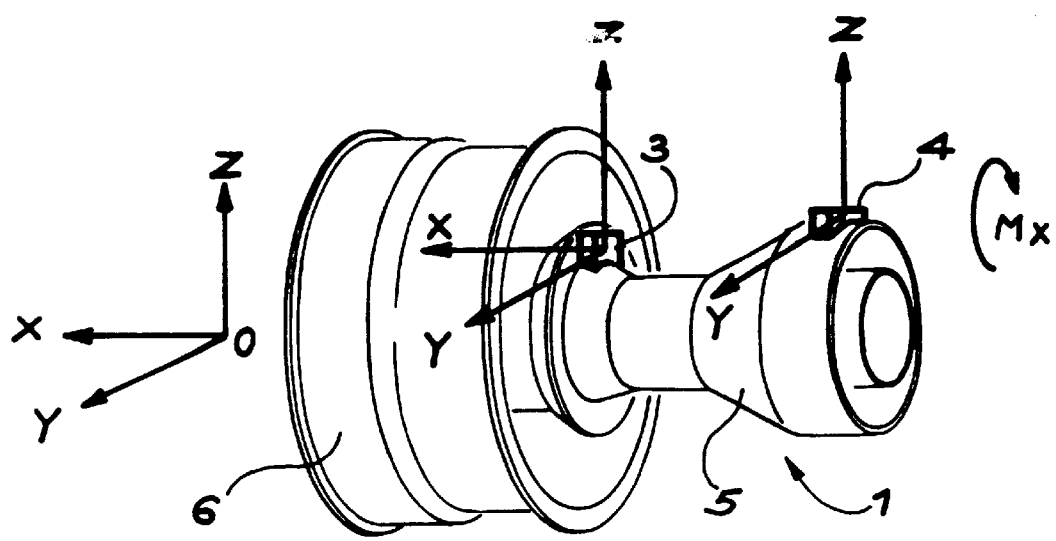
FIG. 1A, already described, diagrammatically and in perspective a propulsion system equipped with a core-type fixing device.
Figure 1B:
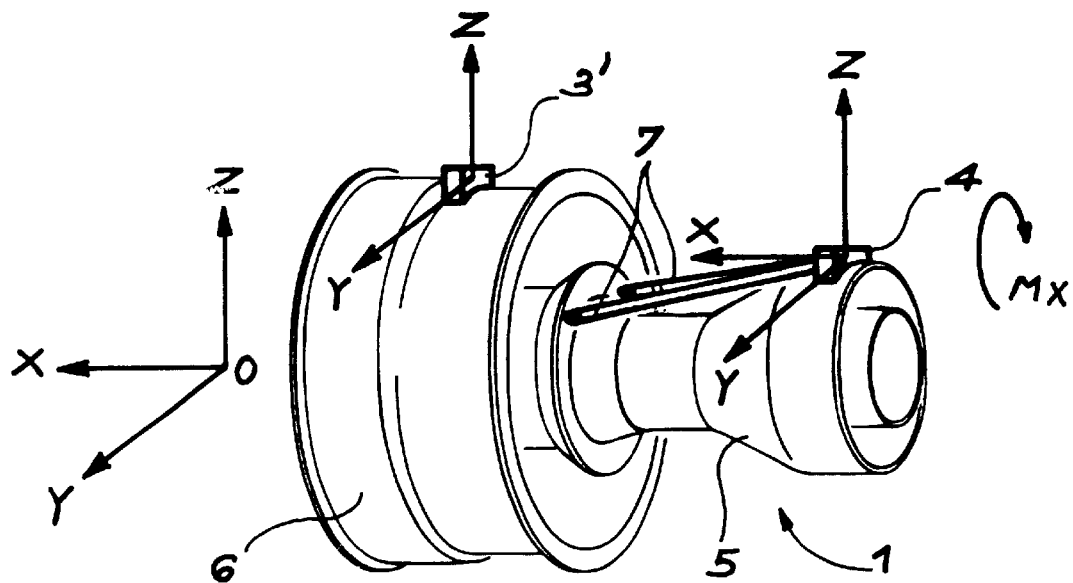
FIG. 1B, already described, diagrammatically and in perspective a propulsion system equipped with a hybrid fan-type fixing device.
Figure 2:
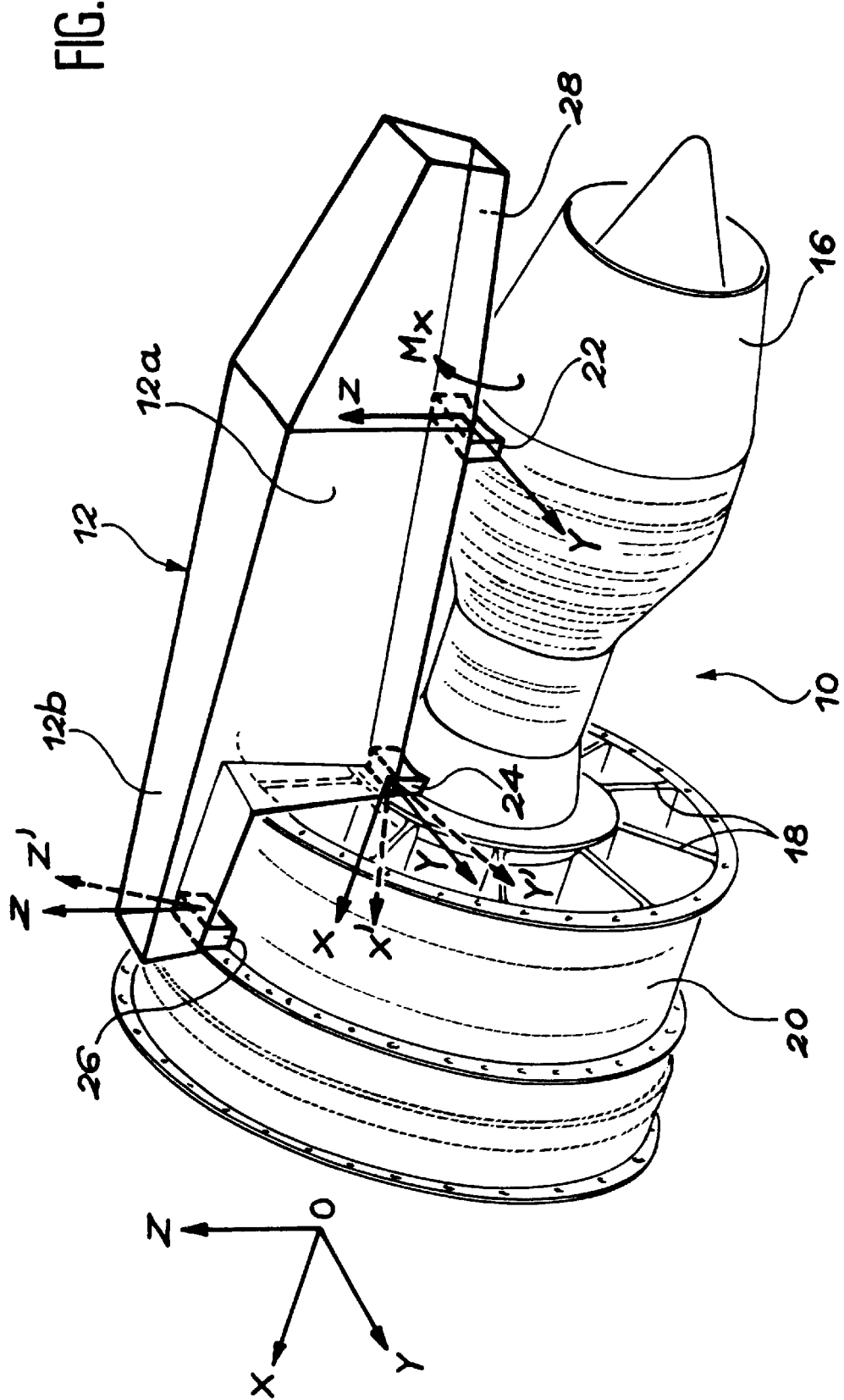
FIG. 2 a perspective view of a propulsion system connected to a strut by a fixing device illustrating a first embodiment of the invention.

FIG. 2 shows a propulsion system 10 suspended on a not shown aircraft wing by means of an attachment strut. It should be noted that in a variant the strut can also be used for connecting the propulsion system 10 to another aircraft structural element such as a fuselage element. The orientations of the forces are then modified as a consequence of this.

The propulsion system 10 comprises an engine including a central casing 16 and a not shown pod coaxially surrounding said casing 16. Stationary vanes 18 connect a front part of the central casing 16 of the engine to a fan stator case 20 completing the internal envelope of the pod around a not shown fan located to the front of the engine.

Moreover, FIG. 2 only shows the frame 12 of the attachment strut for connecting the propulsion system 10 to the aircraft engine. The aerodynamic shroud and the structures used for supporting the different systems in the strut are not illustrated.

According to the invention, the propulsion system 10 is connected to the strut frame 12 by a fixing device comprising at least one rear mount 22, a first front mount 24 and a second front mount 26.

More specifically, the strut frame 12 in this case forms a box-type structure comprising a main part 12a, as well as a front part 12b. The front part 12b projects towards the front of the engine with respect to the main part 12a of the frame.

The main part 12a of the strut frame 12 comprises an interface 28, which is oriented downwards in the described embodiment applied to the attachment of an engine beneath the wing of an aircraft. This interface 28 is connected to the central casing of the engine by the rear mount 22 and by the first front mount 24 in structural areas of the central casing 16 able to transmit forces and placed respectively to the rear and front of said central casing.

The front part 12b projecting from the strut frame 12 is located at a point displaced towards the exterior of the propulsion system 10 with respect to the interface 28. It is connected to the fan stator case 20 by the second front mount 26. More specifically, said connection is preferably located in an area of the fan stator case 20 structurally connected to the central casing 16 by stationary vanes 18. As a variant, the second front mount 26 can also be connected to the fan stator case 20 in another part thereof, which is sufficiently rigid to ensure the transmission of forces.

In the above-defined fix OXYZ, the second front mount 26 is designed so as to only normally ensure, between the fan stator case 20 and the strut frame 12, the transfer of forces mainly exerted along the Z axis. Therefore said mount 26 can in particular be constituted by a system of rods with a crossbar or by any other equivalent system able to fulfil the same function.

More specifically and as illustrated in FIG. 2, the forces transmitted to the frame 12 from the engine through the mount 26 can either be oriented in accordance with the OZ axis, or oriented in a direction Z' inclined by a few degrees relative to the OZ axis. In other words, the direction of the forces transmitted to the strut frame 20 through the second front mount 26 comprises a principal component oriented in accordance with the OZ axis.

In the first embodiment of the invention illustrated in FIG. 2, the first front mount 24 can consequently be simplified compared with the core-type mount so as to only normally transfer between the central casing 16 of the engine and the strut frame 12 forces mainly exerted in the directions X and Y. In other words, the first front mount 24 then transfers to the strut frame 12 forces oriented in a direction X' contained in the plane XOZ and including a principal component oriented in accordance with the OX axis and forces oriented in a direction Y' contained in the YOZ plane and including a principal component oriented in accordance with the OY axis. This function can in particular be obtained by implementing the mount 24 in the form of a swivel pin in the central casing 16 or by any other equivalent mechanism able to fulfil the same function.

As in core-type fixing devices, the rear mount 22 is then designed as to normally transfer between the central casing 16 of the engine and the strut frame 12 forces exerted in directions Y and Z and moments $M_X$ exerted in accordance with the OX axis. Thus, the mount 22 can be implemented in the same way as in existing core-type fixing devices.

Figure 3:
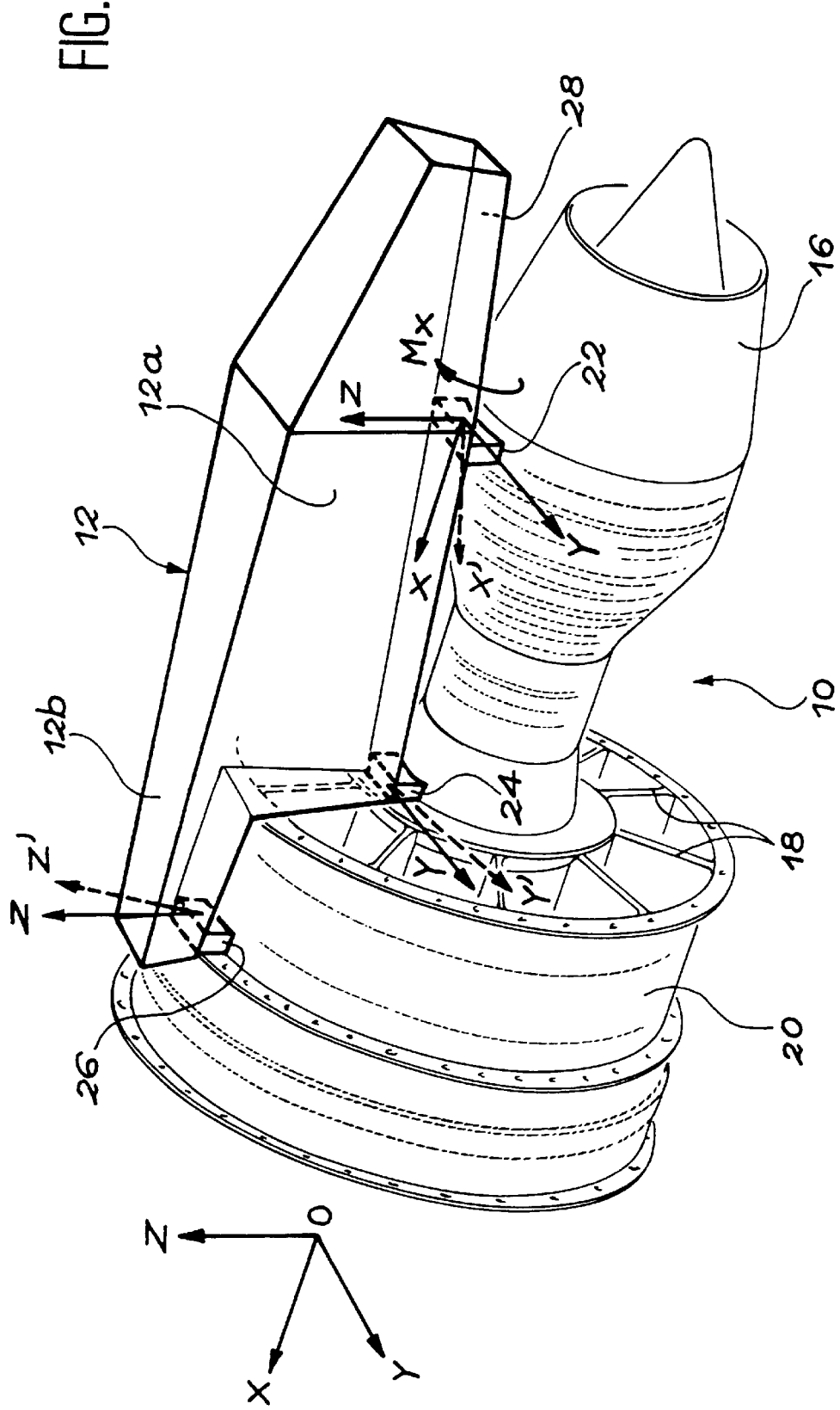
FIG. 3 a view comparable to FIG. 2 illustrating another embodiment of the invention.

In the second embodiment of the invention illustrated in FIG. 3, the function of the second front mount 26 is unchanged compared with the first embodiment described hereinbefore. However, instead of being transmitted to the strut frame 12 through the first front mount 24, the thrust forces mainly exerted in direction X are in this case transmitted through the rear mount 22.

Thus, the first front mount 24 can be further simplified, so as to only transfer normally between the central casing 16 of the engine and the strut frame 12 forces exerted mainly in the direction Y, i.e. forces exerted in a direction Y' contained in the plane YOZ including a principal component oriented in accordance with the OY axis. This function can in particular be obtained by implementing the mount 24 in the form of a rod connecting a cap integral with the central casing 16 to a cap for fixing to the strut frame or by any equivalent mechanism able to fulfil the same function.

As in the hybrid fan-type fixing devices, the rear mount 22 is then designed so as to normally transfer between the central casing 16 of the engine and the strut frame 12 forces exerted in the lateral Y and vertical Z directions with respect to the central casing 16, as well as moments $M_X$ along the OX axis. Moreover, two not shown rods connect the rear mount 22 to the front part of the central casing 16 of the engine to enable the rear mount 22 to take up forces exerted mainly in direction X, i.e. in a direction X' contained in the plane XOZ and including a principal component oriented in accordance with the OX axis.

In another not shown embodiment, the forces mainly exerted in the direction X are not taken up either by the first front mount 24 or by the rear mount 22, but instead by a fourth mount connecting the central casing 16 of the engine to the strut frame 12. This fourth mount can be placed between the mounts 22 and 24, in front of the first front mount 24 or behind the rear mount 22 at a different or identical level thereto.

As a result of the layout according to the invention, the point of taking up forces in direction Z', at the front of the engine, is displaced to the fan stator case 20 compared with the known core-type devices. This feature makes it possible to obtain a better force distribution. Thus, the point of taking up forces in the direction Z' is located closer to the engine air intake, so that it is easier to counter the force exerted by the air on the front of the pod in said direction Z'. Thus, the contribution of said force to the bending of the engine is reduced.

Moreover, the taking up of the force in the direction Z' by the mount 26 makes it possible to relieve the mount 24.

Thus, the latter only has to now take up forces in direction Y and possibly in direction X under normal conditions.

With regards to the strut frame 12, the attachment point of its front part 12b is reinforced in order to take up, without any deformation or fracture of the fan stator case, the force in the direction Z. This is why the mount 26 is located in a reinforced structural area of the fan stator case 20, such that said area is structurally connected to the engine casing 16 by stationary vanes 18.

Moreover, the attachment point of the main part 12a to the front of the engine casing 16 through the mount 24 is comparable to that encountered in a core-type fixing device. Therefore the box-type structure of the frame 12 is extended forwards up to the mount 24. As has already been stated, the layout according to the invention makes it possible to simplify said mount 24, which now only takes up forces in two directions instead of three in core-type devices. However, it should be noted that the mount 24 can be designed to take up other forces under special conditions (broken parts, secondary path, landing without wheels down, etc.).

In the embodiments diagrammatically illustrated in FIGS. 2 and 3, the strut frame 12 is integrally implemented in the form of a box-type structure. However, any other embodiment of the frame 12 able to transmit forces to the aircraft structure can be envisaged, as illustrated by FIGS. 4 to 6.

Figure 4:
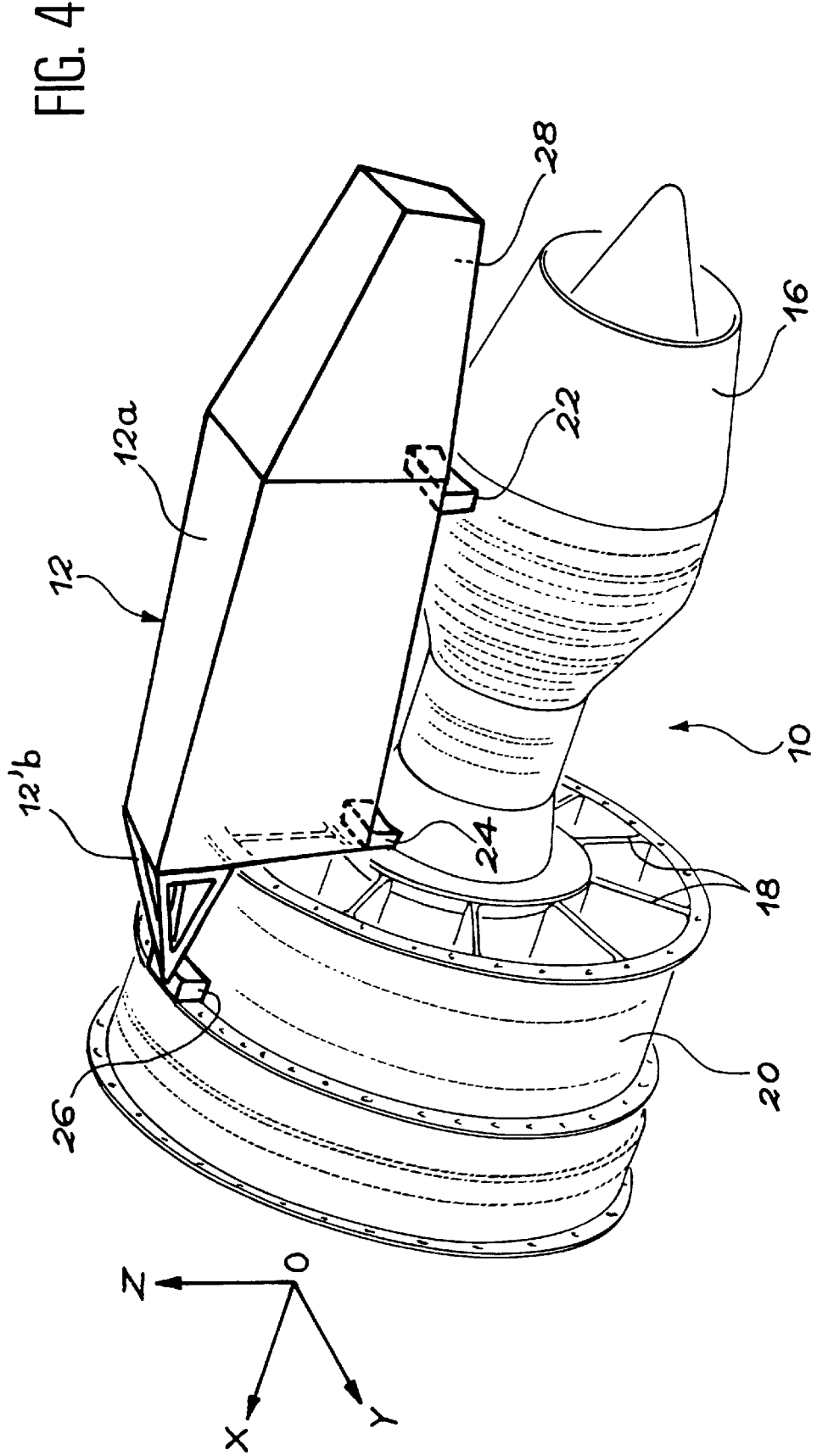
FIGS. 4 to 6 comparable views to FIGS. 2 and 3 illustrating variants of the strut according to the invention.

Thus, FIG. 4 illustrates the case where the main part 12a of the frame 12 is in the form of a box-type structure, whereas the front part 12'b is a pyramidal structure formed by four arms connecting the mount 26 to the main part 12a.

Figure 5:
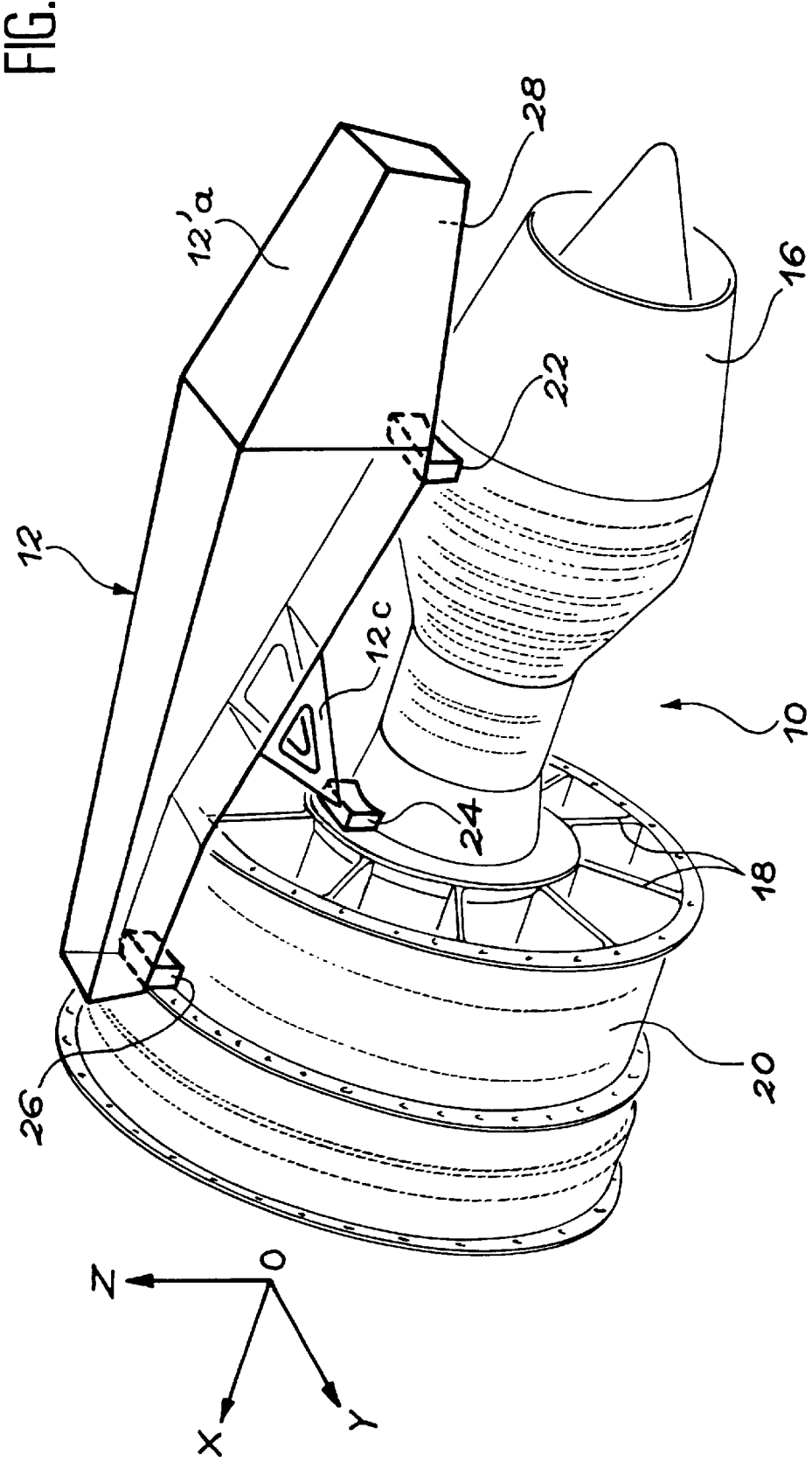

In the case of FIG. 5, a main, box-type part 12'a of the strut frame 12 respectively connected to the fan stator case 20 and to the central casing 16 of the engine by the mounts 26 and 22 is supplemented by a pyramidal structure 12c linking the main part 12a to the mount 24.

Figure 6:
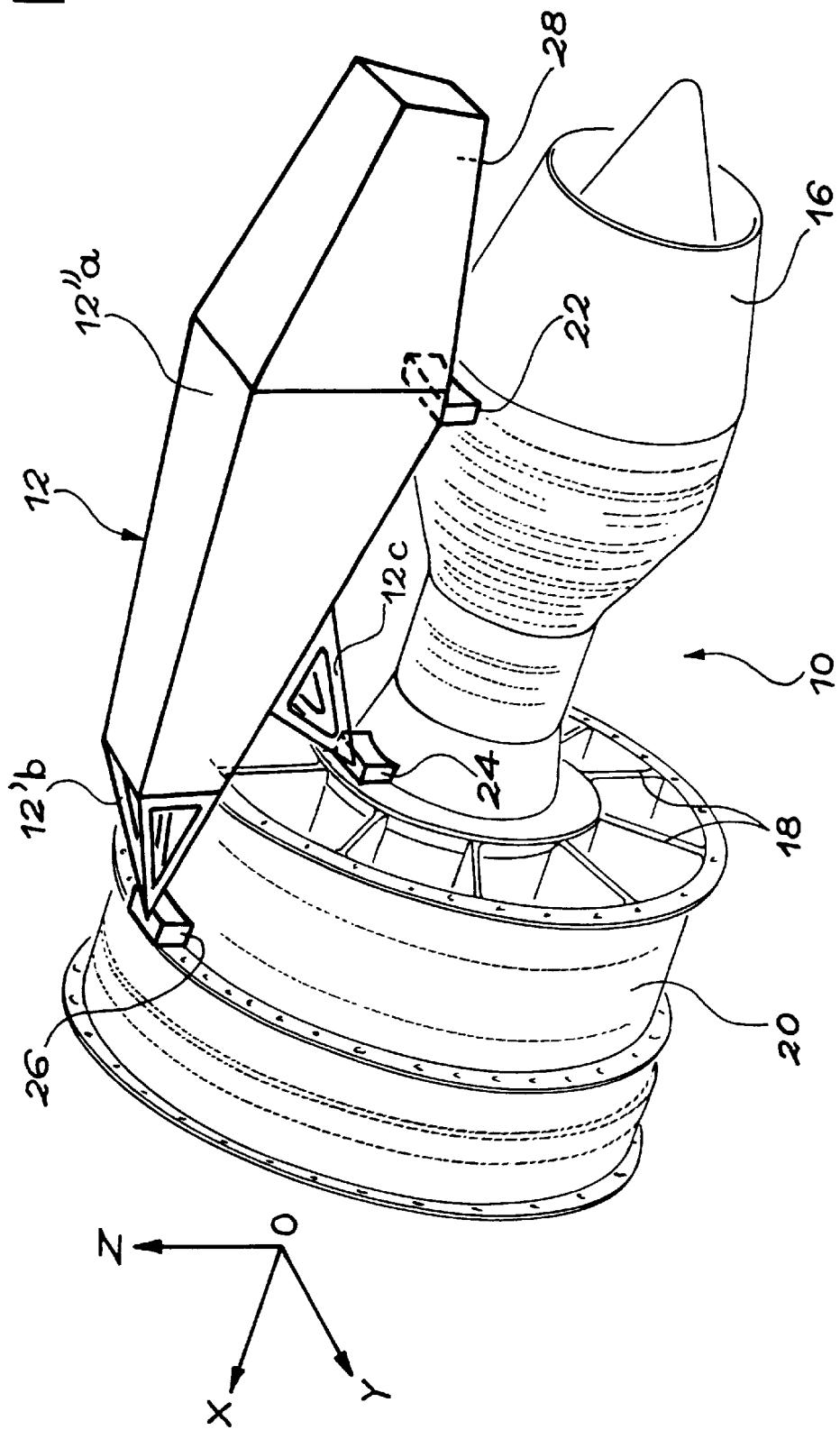

Finally, FIG. 6 illustrates the case where the strut comprises a main, box-type part 12"a, a pyramidal front structure 12'b linking the mount 26 to the part 12"a, and another pyramidal structure 12c linking the mount 24 to the part 12"a.

Any other structure (lattice, etc.) can be adopted for the strut frame 12 without passing beyond the scope of the invention.

In conclusion, the layout according to the invention permits a better distribution of forces and avoids the known problems of conventional layouts. It also simplifies the mounts by reducing the number of forces to be taken into account.

As has already been stated, the rear mount can be implemented in the same way as in existing fixtures (e.g. of the core type). As a variant, it can also be implemented in the form of a mount or attachment system in which the functions of taking up forces exerted in the directions Y and Z and moments $M_X$ exerted in the OX axis are separated without passing beyond the scope of the invention.

Finally, it should be noted that the invention can be applied to a strut, whose box-type frame has either a trapezoidal or a rectangular cross-section.

What is claimed is:

1. Device for fixing an aircraft propulsion system to a strut fixed to a structural element of the aircraft, the propulsion system including an engine having a central casing and a fan stator case, the device comprising:

a first front mount and at least one rear mount, respectively directly connecting to the strut a front part and a rear part of the central casing of the engine; and at least one second front mount directly connecting the fan stator case to the strut.

2. Device according to claim 1, wherein the second front mount is normally able to transfer forces exerted mainly in a direction oriented radially from the engine to the strut.

3. Device according to claim 1, wherein the first front mount is normally able to transfer forces exerted mainly in a lateral direction with respect to the engine and the rear mount system is normally able to transfer forces exerted in said radially oriented direction and in the lateral direction, as well as a moment in accordance with a longitudinal axis of the engine.

4. Device according to claim 3, wherein the first front mount is also normally able to transfer forces mainly exerted in a longitudinal direction with respect to the engine.

5. Device according to claim 3, wherein the mount system is also normally able to transfer forces mainly exerted in a longitudinal direction with respect to the engine.

6. Device according to claim 3, wherein a fourth mount, normally able to transfer forces exerted mainly in a longitudinal direction with respect to the engine, also links the central casing of the engine to the strut.

7. Device according to claim 1, wherein the second front mount is connected to a structural area of the fan stator case able to transmit said forces and the first front mount and the rear mount system are connected to structural areas of the central casing of the engine able to transmit said forces.

8. Device according to claim 1, wherein the mounds transfer the forces exited on the engine to the strut.

9. Strut for attaching a propulsion system to an aircraft structural element able to support the propulsion system by fixing device, the propulsion system including an engine having a central casing and a fan stator case, the device comprising:

a first front mount and a rear mount, respectively directly connecting to the strut a front part and a rear part of the central casing of the engine; and at least one second front mounting directly connecting the fan stator case to the strut, wherein the strut frame comprises a main part, whereof an interface can be connected to the engine casing by the first front mount and by the rear mount the strut frame also comprising a front part projecting with respect to the main part, at a location displaced towards the exterior of the propulsion system with respect to said interface, said front, projecting part being connectable to the fan stator case by the second front mount.

* * * * *